(12) United States Patent
Wester

(10) Patent No.: US 8,229,828 B1
(45) Date of Patent: *Jul. 24, 2012

(54) MUTUAL FUND AND METHOD FOR ALLOCATING ASSETS IN A MUTUAL FUND

(75) Inventor: Stuart Houston Wester, San Antonio, TX (US)

(73) Assignee: United Services Automobile Association, San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/239,174

(22) Filed: Sep. 21, 2011

Related U.S. Application Data

(63) Continuation of application No. 12/900,103, filed on Oct. 7, 2010, now Pat. No. 8,046,287, which is a continuation of application No. 11/227,049, filed on Sep. 15, 2005, now Pat. No. 7,831,495.

(60) Provisional application No. 60/644,711, filed on Jan. 18, 2005.

(51) Int. Cl.
*G06Q 40/00* (2012.01)

(52) U.S. Cl. .............. 705/36 R; 705/35; 705/37; 705/38

(58) Field of Classification Search .................... 705/35, 705/36 R, 37, 38, 39, 40, 41, 42, 43, 44
See application file for complete search history.

(56) References Cited

U.S. PATENT DOCUMENTS

| | | | | |
|---|---|---|---|---|
| 5,812,987 | A * | 9/1998 | Luskin et al. | 705/36 R |
| 7,831,495 | B1 * | 11/2010 | Wester | 705/36 R |
| 7,996,296 | B2 * | 8/2011 | Lange | 705/37 |
| 8,046,287 | B1 * | 10/2011 | Wester | 705/36 R |
| 2002/0147670 | A1 * | 10/2002 | Lange | 705/35 |

* cited by examiner

*Primary Examiner* — Muriel Tinkler

(74) *Attorney, Agent, or Firm* — Kilpatirck Townsend & Stockton LLP

(57) ABSTRACT

A system and method of investing and reallocating fund assets include investing assets in a first class in a fund having substantially a single asset class at any given time. The system and method further include determining whether a signal is given to reallocate the assets to a second asset class different from the first asset class, and reallocating the assets in the fund to the second asset class if the signal is given to reallocate the assets. In embodiments of the invention, the fund is diversified among different asset classes over time rather than at any instant.

20 Claims, 2 Drawing Sheets

MUTUAL FUND AND METHOD FOR ALLOCATING ASSETS IN A MUTUAL FUND

CROSS REFERENCES TO RELATED APPLICATIONS

This application is a continuation of U.S. patent application Ser. No. 12/900,103, filed on Oct. 7, 2010; which is a continuation of U.S. patent application Ser. No. 11/227,049, filed on Sep. 15, 2005, now U.S. Pat. No. 7,831,495; which claims the benefit of U.S. Provisional Application No. 60/644,711, filed Jan. 18, 2005. The contents of these applications are hereby incorporated by reference in their entirety.

BACKGROUND OF THE INVENTION

1. Field

This invention relates to mutual funds and methods for allocating assets in mutual funds.

2. Description of Related Art

Mutual funds provide advantages for investors including professional management and diversification of investments. Each investment in a mutual fund typically buys a share of a diversified portfolio of assets. The portfolio may be managed by investment professionals, relieving the individual investor of the need to make individual stock or bond selections.

Conventional asset allocation mutual funds tend to use conventional asset allocation strategies in which fund assets are allocated among three asset classes, stocks, bonds and cash equivalents, at one time. For example, a mutual fund may include 60% of fund assets invested in stocks, 30% of fund assets invested in bonds and 10% of fund assets invested in cash equivalents. These asset allocation percentages may be modified somewhat over time as market conditions change, but some allocation to all three asset classes is maintained. Therefore, substantially less than 100% of total fund assets are invested in any one asset class at one time.

Although conventional asset allocation strategies help to minimize risk by diversifying investments, these strategies are still susceptible to wide fluctuations in returns. Despite diversification, investors in conventional mutual funds risk incurring losses and negative returns, particularly in bear markets. Additionally, many conventional mutual funds using conventional asset allocation strategies fail to outperform major benchmark indices, such as the S&P 500 Stock Index, over long periods of time.

Accordingly, there is a need for an improved asset allocation mutual fund and a method for allocating assets in mutual funds that provide a positive rate of return every calendar year. Additionally, there is a need for an asset allocation mutual fund and a method for managing assets in mutual funds that provide greater long-term returns than the S&P 500 Stock Index, but with less risk.

BRIEF DESCRIPTION OF THE DRAWINGS

The utility of the embodiments of the invention will be readily appreciated and understood from consideration of the following detailed description of the embodiments of this invention, when taken with the accompanying drawings, in which same numbered elements are identical or similar.

DETAILED DESCRIPTION OF THE INVENTION

In an embodiment, an asset allocation mutual fund comprises assets invested, at any one time, substantially 100% in one of stocks, bonds or cash equivalents. As market conditions change, confirmed by changes in the outputs of certain stock and bond models, substantially all of the assets may be shifted from one of these three asset classes to another. A method for allocating assets in a mutual fund, among the three asset classes, according to one embodiment, includes first determining whether a buy signal has been given on stocks using a stock model. If a buy signal has been given on stocks, substantially all assets of the mutual fund may be invested in stocks. If a buy signal on stocks is not indicated, it is determined whether a buy signal has been given on bonds using a bond model. If a buy signal has been given on bonds, substantially all assets of the mutual fund may be invested in bonds. If a buy signal on bonds is not indicated, substantially all assets of the mutual fund may be invested in cash equivalents. The method may be repeatedly queried over time to consider re-allocation of assets.

Diversification among asset classes, for the first time, is provided only over time, and not at any instant, as in conventional asset allocation funds. That is, conventional asset allocation funds spread their assets over all asset classes at any given time. For example, at any given time, a conventional asset allocation fund may have its assets 60% in stocks, 30% in bonds, and 10% in cash equivalents. These percentages may be modified somewhat as market conditions change, but some allocation to all three asset classes is maintained at all times, and provides diversification over all asset classes at all times. The present embodiments, however, for the first time take an all or nothing approach for asset allocation at any instant, for example, investing 100% in stocks now, but 100% in bonds later, and then 100% in cash equivalents. In this way, the present embodiments seek diversification of asset classes over time, but not at any instant. As a result, superior investment returns are sought.

Figure 1:
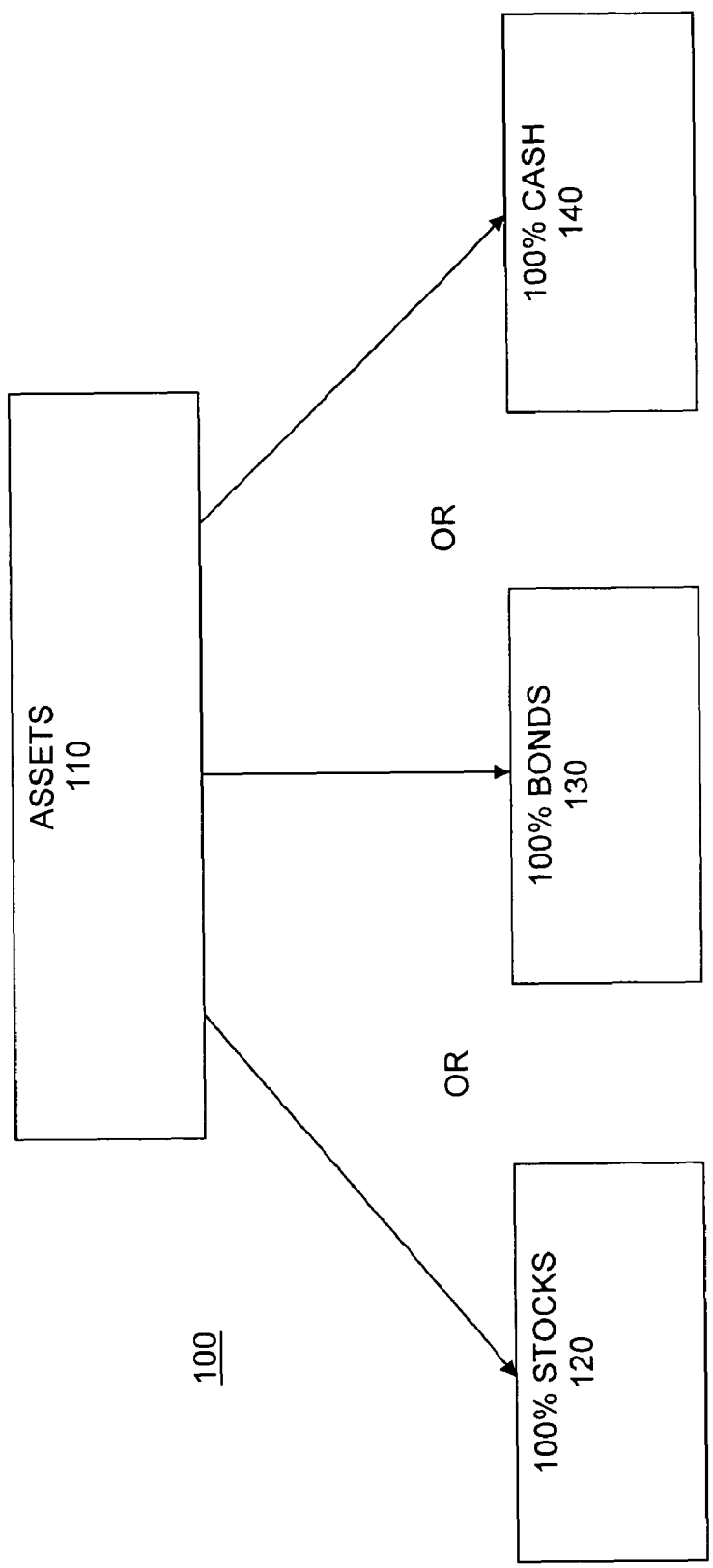
FIG. 1 illustrates an object diagram of a mutual fund according to one embodiment.

FIG. 1 illustrates an object diagram of a mutual fund 100 (fund) according to one embodiment. The fund's principal investment strategy may be to shift assets 110 in the fund 100 among stocks 120, bonds 130, or cash equivalents 140. It is anticipated that at any given time 100% or substantially all, such as, for example, about 95% or more, of the fund assets 110 may be invested in (1) stocks 120, (2) bonds 130, or (3) cash equivalents 140.

In this embodiment, at a given time, substantially all, or 100%, of the fund assets 110 may be invested in stocks 120, either directly or through the use of stock-based, exchange-traded funds (ETFs). For example, all of the fund assets 110 may be invested in an ETF tracking the S&P 500, or in a group of ETFs, or the fund assets 110 may be directly invested in stocks. The stocks 120 in the ETFs in the stock asset class typically may represent the large-capitalization sector of the U.S. equity market, but may at times represent other sectors of the U.S. equity market. ETFs, are, with a few exceptions, open-end investment companies that trade throughout the day. Almost all ETFs trade on the American Stock Exchange or other exchanges. More specifically, ETFs typically track a market index or specific sectors of the stock or bond markets. Because they trade like a stock, ETFs offer trading flexibility generally desired by both individuals and institutions. Like any security that trades on an exchange, the value of the underlying securities is a major factor in determining an ETF's price. The price of an ETF is generally determined by supply and demand. The fund 100 may value any ETF in its portfolio at its market price, which typically approximates its net asset value (NAV), although there may be times when the market price and NAV vary to a greater extent. Thus, ETFs do not necessarily trade at the net asset values of their underlying securities.

In this embodiment, at a given time, substantially all, or 100%, of the fund assets 110 may be invested in bonds 130, such as, for example, investment-grade bonds, through either direct investment or ETFs. For example, all of the fund assets 110 may be invested in an ETF tracking a bond index, or in a group of ETFs, or the fund assets 110 may be directly invested in bonds. Investment-grade bonds 130 may include, for example, securities issued or guaranteed by the U.S. government, its agencies and instrumentalities, as well as securities rated or subject to a guarantee that is rated within the rating categories listed by at least one of the following rating agencies in Table 1:

TABLE 1

| Rating Agency | Long-Term Debt Securities | Short-Term Debt Securities |
| --- | --- | --- |
| Moody's Investors Service | At least Baa3 | At least Prime-3 or MIG 3/VMIG 3 |
| Standard & Poor's Ratings Group | At least BBB- | At least A-3 or SP-2 |
| Fitch Ratings | At least BBB- | At least F3 |
| Dominion Bond Rating Service | At least BBB low | At least R-2 low |

If unrated by these agencies, the fund 100 may determine that the securities are of equivalent investment quality.

In this embodiment, at a given time, substantially all, or 100%, of the fund assets 110 may be invested in cash equivalents 140, such as, for example, money market instruments. The money market instruments included in the fund's portfolio may be investment-grade, U.S. dollar-denominated debt securities that have remaining maturities of one year or less. They may carry either fixed or variable interest rates and may include, but are not limited to, any of the following: obligations of the U.S. government, its agencies and instrumentalities; repurchase agreements collateralized by the foregoing obligations; commercial paper or other short-term corporate obligations; certificates of deposit; bankers acceptances; money market funds; short-term investment funds; variable rate-demand notes; and other suitable obligations.

In this embodiment, the decision to shift substantially all of the fund assets 110 among the three asset classes of stocks 120, bonds 130, or cash equivalents 140, may be made by a decision algorithm described in FIG. 2 hereof, which uses a stock model and a bond model as discussed below. Stock and bond models provided by third party vendors, or other investment models may be used with the embodiments described herein. For example, a stock model may be used that outputs an index of stock market bullishness of 0% to 100%. Then an output signal over a given percentage X % may be taken as a "buy" signal, and an output signal at or below X % may be taken as a "sell" or "don't buy" signal. Alternatively, the model may simply output directly a "buy" or "sell"/"don't buy" signal.

Also, for example, a bond model may be used that outputs an index of bond market bullishness of 0% to 100%. Then an output signal over a given percentage Y % may be taken as a "buy" signal, and an output signal at or below Y % may be taken as a "sell" or "don't buy" signal. Alternatively, the model may simply output directly a "buy" or "sell"/"don't buy" signal.

In an embodiment, the stock and bond models may use technical analysis of market and economic data to generate their outputs, or use other approaches, such as fundamental analysis.

Figure 2:
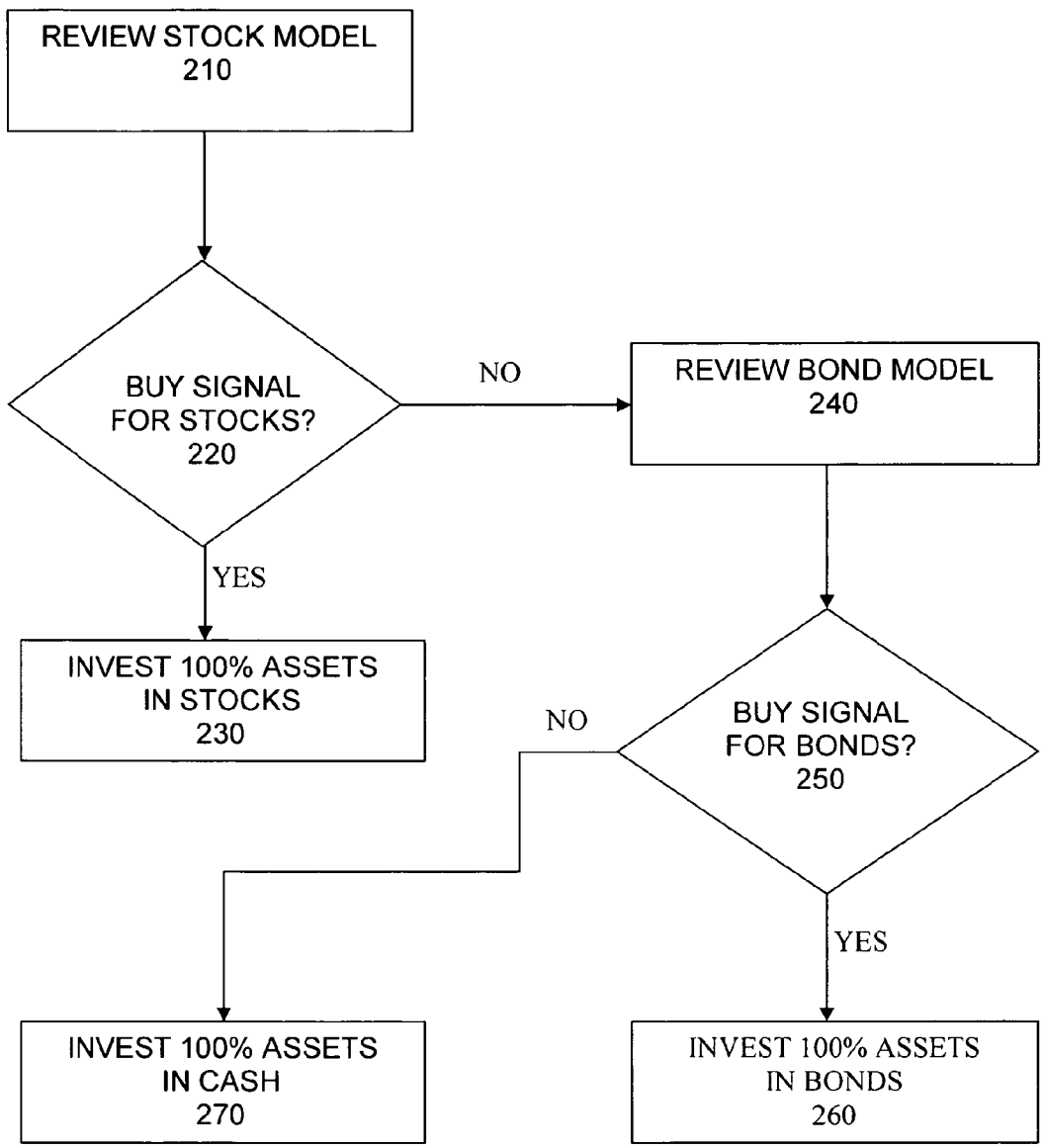
FIG. 2 illustrates a flow diagram representing a method for allocating assets in a mutual fund according to one embodiment.

FIG. 2 illustrates a flow diagram representing a method for allocating assets in a mutual fund among the three classes of assets, stocks, bonds and cash equivalents, according to this embodiment. A stock model may be reviewed in 210 to determine in 220 if a buy signal is given for stocks. A buy signal may be indicated based on a data point derived from the stock model. The buy signal may change as conditions change and are reflected in changed output data in the stock model. If a buy signal has been given for stocks, substantially all, or 100%, of the fund assets 110 may be invested in stocks or stock ETFs, in 230.

If the stock model does not indicate a buy signal on stocks, then a bond model may be reviewed in 240 to determine in 250 if a buy signal is given for bonds. A buy signal may be indicated based on a data point derived from the bond model. The buy signal may change as conditions change and are reflected in changed output data in the bond model. If a buy signal has been given for bonds, substantially all, or 100%, of the fund assets 110 may be invested in bonds, such as investment-grade bonds or investment-grade bond ETFs, in 260. If the bond model does not indicate a buy signal on bonds, substantially all, or 100%, of the fund assets 110 may be invested in cash equivalents, such as short-term, high-quality money market instruments or a money market fund, in 270. The algorithm in FIG. 2 may be queried repeatedly at preset cycles, such as for example, daily, weekly, monthly, quarterly, or irregular cycles, or may be queried on an event-driven basis, such as for example, in response to significant changes in various financial indices, to determine if the fund assets 110 should be re-allocated due to changed conditions.

In one embodiment, the decision points at 220 and 250, based on the stock and bond models, are based on the concept that stocks or bonds should be purchased only when they appear to offer superior returns, and that they should be sold when they no longer appear to offer superior returns. In one embodiment, the key concepts used in arriving at the decision points may be (1) a strong desire to avoid losses, (2) the desire to invest in the markets only when they appear to offer superior returns, (3) the desire to have a disciplined, objective decision-making process using time-tested buy/sell rules, and (4) the belief that using moving averages, momentum indicators, and other internal market indicators enhances the possibility of success.

Fund assets 110 may be actively and frequently traded to implement the fund's principal investment strategy. During times when fund assets 110 are being switched from one asset class to another, fund assets 110 may be spread between the new class and the previous class for a brief period of transition. Net additions or subtractions of fund assets 110 from the fund 100 may lead to transition amounts passing through the cash equivalents class for a short period, while substantially all of the remaining fund assets 110 are invested in one of the other asset classes.

The fund's portfolio turnover rate may vary from year to year depending on the frequency of the investment allocation decisions made.

In one embodiment, a manager (not shown) may provide investment management services to the fund 100 pursuant to an investment advisory agreement. Under the agreement, the manager may be responsible for managing the business and affairs of the fund 100, including administration, shareholder servicing, and distribution services. To compensate the manager for its services, the fund 100 may pay the manager a management fee, which may be comprised of a base fee and a performance adjustment that may increase or decrease the base fee depending upon the performance of the fund 100 relative to the performance of a benchmark index, such as the Lipper Flexible Portfolio Funds Index. The base fee may be accrued daily and paid on a monthly basis. The performance adjustment may be calculated monthly by comparing the fund's performance to that of the benchmark index over a specified performance period. In one embodiment, the total management fee may be capped at 1.00% of the fund's average annual net assets.

The diagrams depicted herein are provided by way of example. There may be variations to these diagrams or the operations described herein without departing from the spirit of the invention. For instance, in certain cases, the operations may be performed in differing order, or operations may be added, deleted or modified.

One or more computers may be used to keep the books and records that may be necessary or convenient for the present invention, and its various embodiments, and to issue reports, periodically or occasionally, for the management or monitoring of the same. For example, a database may be maintained for each investor account in the mutual fund, showing for the account the NAV, the distributions made for the year and to be made, and other data. Databases may also be maintained showing the total investments of the assets of the fund and their performance. The stock model and the bond model may also be executed by a computer, and be provided data input by a computer system, and the models' outputs may be communicated and stored by a computer, including any stock buy signals, and any bond buy signals. Periodic or occasional reports may be generated, electronically or in hardcopy, for any of the information in such databases, for the benefit of individual investors in the fund, for the fund investment managers, or for other parties.

While the invention has been described in relation to certain embodiments, it will be understood by those skilled in the art that other embodiments, and modifications to the disclosed embodiments, may be made without departing from the spirit and, scope of the invention. Changes may be made, within the purview of the appended claims, without departing from the scope and spirit of the invention in its aspects. Thus, it should be understood that the above-described embodiments have been provided by way of example rather than as a limitation of the invention and that the specification and drawing(s) are, accordingly, to be regarded in an illustrative rather than a restrictive sense. As such, the invention is not intended to be limited to the embodiments shown above but rather is to be accorded the widest scope consistent with the principles and novel features disclosed in any fashion herein.

What is claimed is:

1. A computer implemented method of investing and reallocating fund assets, the method comprising:
    investing assets in a first asset class in a fund having a single asset class at any given time;
    determining, by a computer system, whether a signal is given to reallocate the assets to a second asset class different from the first asset class; and
    reallocating, by the computer system, the assets in the fund to the second asset class if the signal is given to reallocate the assets, wherein the fund is diversified among different asset classes over time.

2. The method of claim 1 further comprising:
    determining that the signal is a buy signal for stocks using a stock model; and
    investing all the assets of the fund in stocks.

3. The method of claim 2 wherein the stocks include at least one of individual stocks or stock-based exchange-traded funds.

4. The method of claim 1 further comprising:
    determining that the signal is a buy signal for bonds using a bond model; and
    investing all the assets of the fund in bonds.

5. The method of claim 4 wherein the bonds include at least one of individual bonds or bond-based exchange-traded funds.

6. The method of claim 1 further comprising:
    determining that the signal is neither a buy signal for stocks using a stock model nor a buy signal for bonds using a bond model; and
    investing all the assets of the fund in cash equivalents.

7. The method of claim 6 wherein the cash equivalents include money market instruments.

8. The method of claim 1 wherein the signal is given on at least one of a cyclical basis or an event-driven basis.

9. The method of claim 8 wherein the cyclical basis comprises at least one of a daily, weekly, monthly, quarterly, and irregular cycle.

10. The method of claim 1 wherein the single class asset can be selected from a plurality of asset classes including stocks, bonds, and cash equivalents.

11. The method of claim 1 wherein the fund having the single asset class at any given time comprises about 95% or more of the assets in the single class.

12. A computer system for investing and reallocating fund assets, the system comprising one or more computers configured to:
    invest assets in a first asset class in a fund having a single asset class at any given time;
    determine, by the one or more computers, whether a signal is given to reallocate the assets to a second asset class different from the first asset class; and
    reallocate, by the one or more computers, the assets in the fund to the second asset class if the signal is given to reallocate the assets, wherein the fund is diversified among different asset classes over time.

13. The system of claim 12 wherein the one or more computers are further configured to:
    determine that the signal is a buy signal for stocks using a stock model; and
    invest all the assets of the fund in stocks.

14. The system of claim 12 wherein the one or more computers are further configured to:
    determine that the signal is a buy signal for bonds using a bond model; and
    invest all the assets of the fund in bonds.

15. The system of claim 12 wherein the one or more computers are further configured to:
    determine that the signal is neither a buy signal for stocks using a stock model nor a buy signal for bonds using a bond model; and
    invest all the assets of the fund in cash equivalents.

16. The system of claim 12 wherein the signal is given on at least one of a cyclical basis or an event-driven basis.

17. The system of claim 12 wherein the single class asset can be selected from a plurality of asset classes including stocks, bonds, and cash equivalents.

18. The system of claim 17 wherein the stocks include at least one of individual stocks or stock-based exchange-traded funds, the bonds include at least one of individual bonds or bond-based exchange-traded funds, and the cash equivalents include money market instruments.

19. The system of claim 17 wherein the money market instruments comprise investment-grade, U.S. dollar-denominated debt securities that have remaining maturities of one year or less.

20. The system of claim 12 wherein the fund having the the single asset class at any given time comprises about 95% or more of the assets in the single class.

* * * * *